United States Patent [19] [11] 3,760,354
Ginn [45] Sept. 18, 1973

[54] ERROR RATE DETECTION SYSTEM

[75] Inventor: David W. Ginn, Newtown, Conn.
[73] Assignee: Data-Control Systems, Inc., Danbury, Conn.

[22] Filed: July 23, 1971
[21] Appl. No.: 165,077

[52] U.S. Cl. .................... 340/146.1 E, 340/146.1 D
[51] Int. Cl. .......................... G08c 25/00, H04l 7/08
[58] Field of Search .............. 340/146.1 E, 146.1 D, 340/146.1 AX; 178/69.5 R; 179/15 BS

[56] References Cited

UNITED STATES PATENTS

| | | | |
|---|---|---|---|
| 3,380,023 | 4/1968 | Magnuski | 340/146.1 E |
| 3,496,536 | 2/1970 | Wheeler et al. | 340/146.1 E |
| 3,550,082 | 12/1970 | Tong | 340/146.1 D |
| 3,562,710 | 2/1971 | Halleck | 340/146.1 E |
| 3,596,245 | 7/1971 | Finnie et al. | 340/146.1 E |
| 3,622,877 | 11/1971 | MacDavid et al. | 340/146.1 E |

*Primary Examiner*—Charles E. Atkinson
*Attorney*—Weingarten, Maxham & Schurgin

[57] ABSTRACT

A system for determining the error rate of a data communications link in which a locally generated code is synchronized to a pseudo-random code transmitted over the link and compared therewith to ascertain errors.

10 Claims, 3 Drawing Figures

INVENTOR
DAVID W. GINN
BY
[signature]
ATTORNEYS

INVENTOR
DAVID W. GINN
BY
Weingarten, Maxham & Schurgin
ATTORNEYS

ERROR RATE DETECTION SYSTEM

FIELD OF THE INVENTION

This invention relates to data communications and more particularly to systems for determining the error rate of a data communications link.

BACKGROUND OF THE INVENTION

In digital communications systems it is desirable to determine the error rate of a data link in order to ascertain its quality for message transmission. In general, the error rate has been determined by transmitting test messages through the link and through a variable delay path and comparing the messages transmitted in order to determine errors therebetween. The reference delay path is difficult to implement, and with recorded data, such as is often employed for data communications, simultaneous access to the data for transmission through the data link and through the delay path is not available.

SUMMARY OF THE INVENTION

In accordance with the present invention, an error rate detector is readily synchronized to a pseudo-random coded message being transmitted over a data link or network, and, once synchronized, generates a code which is compared with the transmitted message to determine error rate. The pseudo-random code is of a format in which no code word is repeated within a frame of data; thus, each frame of data includes a plurality of code words each of which are unique within the frame. Synchronization is accomplished with any code word within a data frame and positive synchronization is easily accomplished within a frame interval.

In operation, a code generator transmits a pseudo-random coded message over a data link, the code being received by an error rate detector. The error rate detector is operative to synchronize with the first error free code word which is received, and will thence generate a like code pattern which is compared with received data. Errors which occur between the received data and the locally generated code pattern are counted by the detector to provide a measure of error rate. In the event that an error free code word is not received by the detector, the detector attempts to synchronize with the next code word which is received, and can likewise continue until synchronization is achieved.

Synchronization is defined as correlation between the received data and the locally generated code to a predetermined accuracy. For example, synchronization can be defined as less than four bit errors in 20 bits of information. If a greater number of bit errors is present, another code word is received and tested for correlation and this process continues until synchronization is accomplished. In practice, synchronization is usually accomplished within the receipt of the first three code words and thus the detector is synchronized with the incoming data very quickly upon receipt of data over the link.

The invention also features a means of adjusting the synchronization of the detector either forward or backward by one bit in the event that synchronization becomes displaced by one bit with the received data. In essence, the system can be caused to adjust the relative timing of the received and locally generated code patterns by 1 bit forward or backward in order to maintain synchronization with the received data stream.

The invention offers major advantages over error rate determining techniques of conventional design. According to conventional techniques, if synchronization with data received from a link is not achieved, the next attempt at synchronization can be accomplished only after receipt of another frame of data, since synchronization is normally accomplished with a code word which is only present once during each frame. In addition, conventional techniques offer no assurance of the validity of data within a frame since synchronization is accomplished only with framing bits and not with all data within a frame. The present invention provides synchronization with any number of code words within a frame and provides data checking for all bits within a frame of information. Synchronization is accomplished by the same circuitry which detects the code words and the invention can therefore be implemented in a relatively inexpensive and simple manner.

DESCRIPTION OF THE DRAWINGS

The invention will be more fully understood from the following detailed description, taken in conjunction with the accompanying drawings, in which.

DETAILED DESCRIPTION OF THE INVENTION

Figure 1:
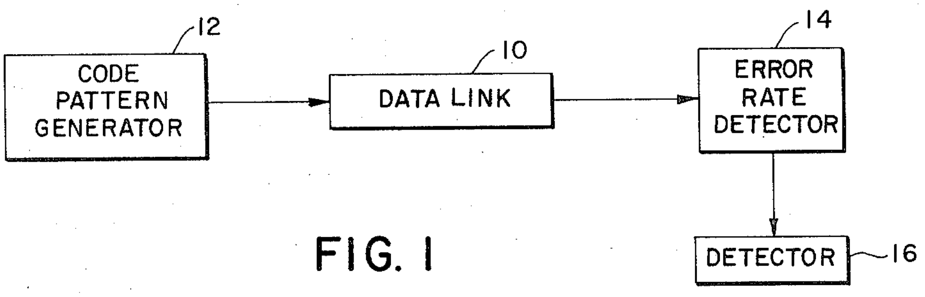
FIG. 1 is a block diagram of a system for error rate determination in accordance with the invention.

Referring to FIG. 1 there is shown a system for determining the error rate of a data link in accordance with the invention. The data link 10 can be any link or network adapted to convey digital information and can be, for example, a telephone line, data modem, magnetic tape recorder or telemetry link. A code pattern generator 12 is coupled to data link 10 and is operative to generate a pseudo-random code and to transmit this code over the data link. An error rate detector 14 is coupled to the output of data link 10 and is operative to compare the data received from the link with an internally generated code pattern to derive the bit error count. The error count can be displayed by a suitable indicator 16, or otherwise employed in the analysis of data link performance. The code generator 12 generates a repetitive serial pseudo-random code of, typically, 2047 bits. Such codes are per se known and can be for example a code of the Fibinochi form in which no code word is repeated within a frame of data. Thus, each frame includes a plurality of code words each of which are unique within a frame.

The code pattern generator 12 comprises the transmitter section of the system, while the error rate detector 14 and indicator 16 comprise the receiver section thereof. If the data link 10 to be evaluated has locally accessible input and output terminals, the transmitter and receiver sections of a single detection system can be employed to provide intended performance analysis. If however, the data link has input and output terminals which are remotely located one from the other, then a physically distinct transmitter is employed at the transmitting end of the data link, and a separate receiver section employed at the receiving end of this link. In either case, system operation is identical, the implementation being varied to suit particular data link characteristics.

Figure 2:
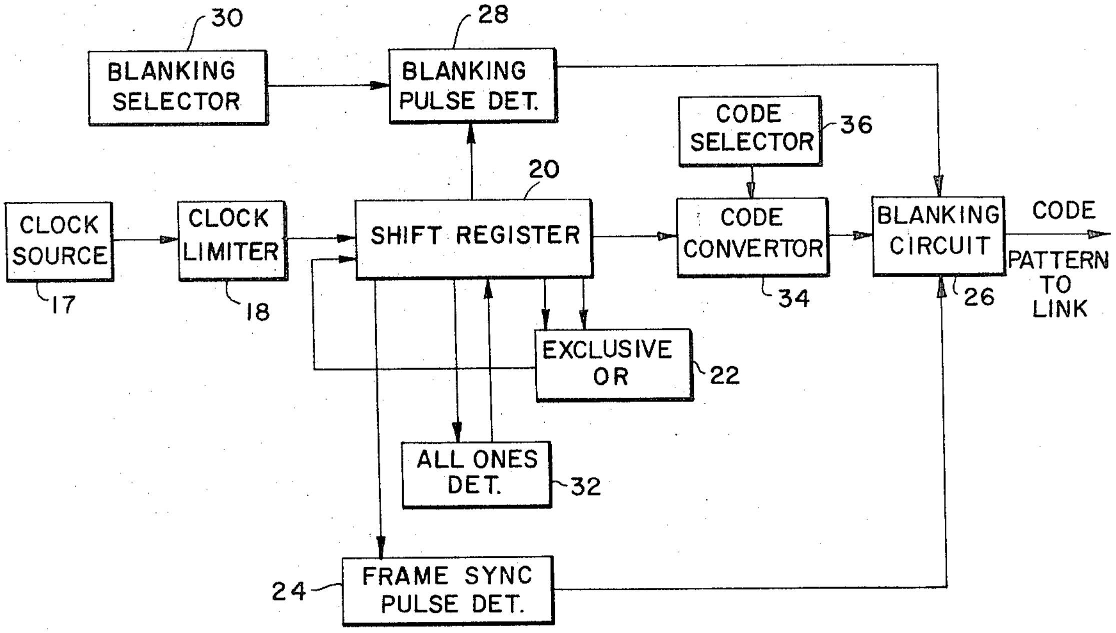
FIG. 2 is a block diagram of a code pattern generator embodied in the invention.

The pseudo-random code pattern is generated in both the transmitter and receiver sections of the system in a similar manner. The code generator in the transmitter section is illustrated in FIG. 2. Clock signals from a suitable source 17 are applied to clock limiter 18 which, in turn, drives a shift register 20. Limiter 18 permits use of a sinusoidal signal source for producing square wave clock pulses to shift register 20. Two output lines from selected bit positions of shift register 20 are connected to an Exclusive OR circuit 22, the output of which is fed back to the input of shift register 20. The operation of a shift register and an Exclusive OR circuit, as illustrated, to generate a pseudo-random code is per se well known. In the illustrated embodiment, shift register 20 is typically an 11 bit register, the 9th and 11th bit positions being coupled to circuit 22 in order to generate a 2047 bit pattern. This repetitive code pattern is applied to the data link under test and similar circuitry in the receiver section of the system is employed to generate a like pseudo-random code which is error free and which is employed for comparison with the pattern received via the data link in order to determine the bit error rate.

A frame sync pulse detector 24 is coupled to shift register 20 and is operative to recognize an all zero condition in register 20 which occurs at the end of each frame of 2047 bits. Upon recognition of this all zero condition, detector 24 provides an output pulse to a blanking circuit 26 which provides a blanking pulse to subsequent system circuitry for purposes of indicating frame synchronization. Blanking circuit 26 also receives pulses from a blanking pulse detector 28 which is coupled to shift register 20 and is also coupled to a manually operable blanking selector 30 which is operative to blank selected bits of the code pattern.

An all ones detector 32 is coupled to shift register 20 and is operative to detect an all ones condition within register 20 and operative, upon recognition of such condition, to apply a reset pulse to register 20 to clear the register. An all ones condition is an illegal code which will not normally occur during system operation. If such an illegal condition does exist, for example by reason of improper system operation, detector 32 will clear register 20 to permit regeneration of the desired pseudo-random code.

The output of shift register 20 is coupled to a code converter 34 which is operative to generate a variety of selected code formats for transmission over the data link under test. Code selection can be accomplished for example by manual controls 36 provided on the system operating panel.

Figure 3:
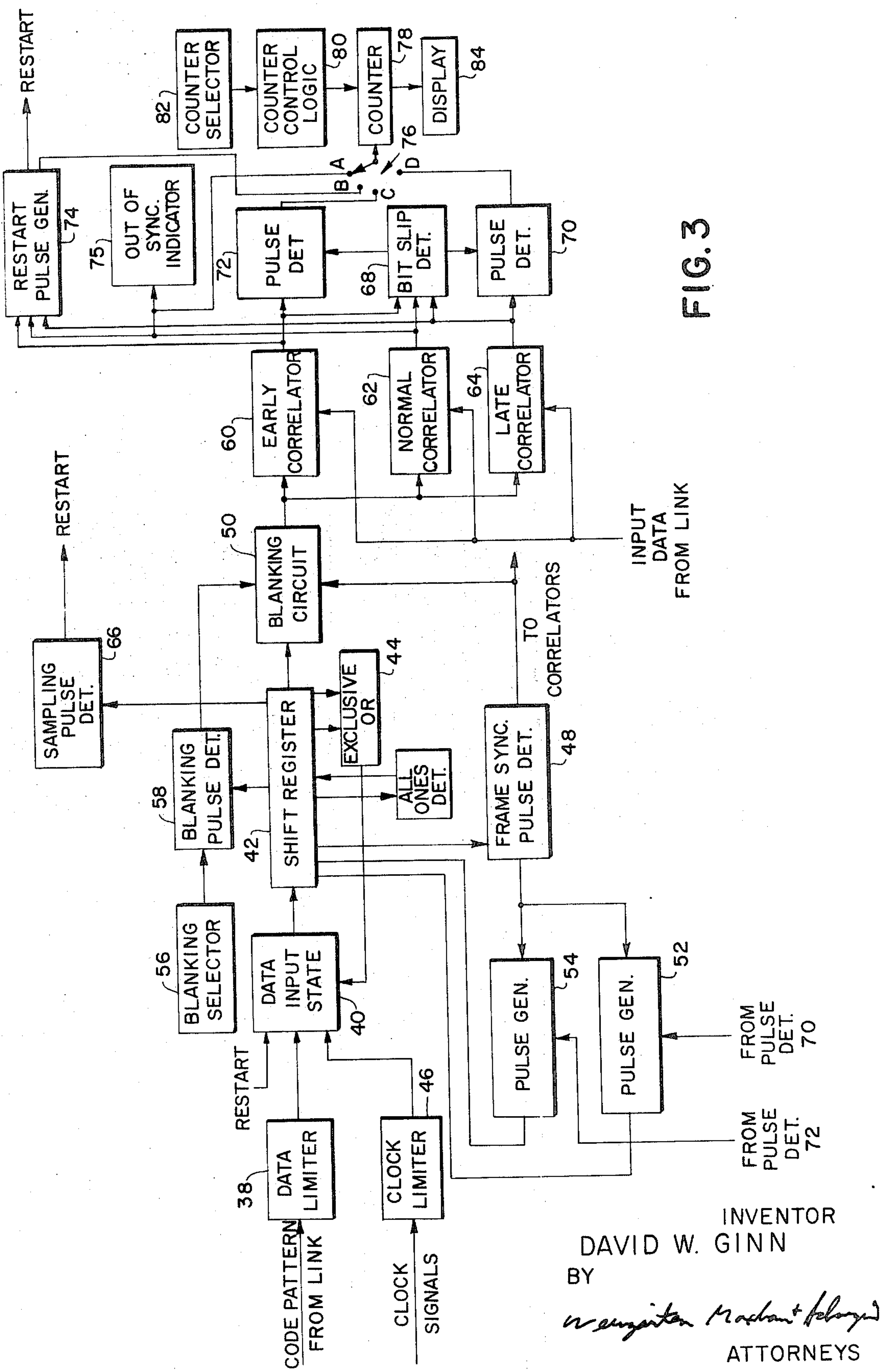
FIG. 3 is a block diagram of an error rate detector according to the invention.

The receiver section of the novel system is depicted in FIG. 3. The code pattern received from the data link is applied to a limiter 38 which reshapes the received pulses for application to an input gate 40. Gate 40 is coupled to the input of a shift register 42 which, in turn, has selected bit positions coupled to an Exclusive OR circuit 44. Register 42 and Exclusive OR circuit 44 are operative as described above as a pseudo-random code generator identical to the generator employed in the transmitter section. Clock pulses from a suitable source are also applied via a limiter 46 to shift register 42. A frame sync pulse detector 48 is coupled to shift register 42 and is operative to detect an all zero condition and for providing in response thereto a blanking pulse to blanking circuit 50 and pulses to generators 52 and 54.

The input gate 40 governs whether data applied to shift register 42 is from Exclusive OR circuit 44 or from limiter 38. This gate permits the loading of eleven bits into register 42, after which data from the feedback path is applied to the register. A code pattern generated by register 42 is applied to blanking circuit 50 which is operative to blank selected bits of the received data stream in accordance with the setting of blanking selector 56 and associated blanking pulse detector 58. The code pattern is applied from blanking circuit 50 to three correlators 60, 62, and 64, which also receive the input data stream.

A sampling pulse detector 66 is coupled to register 42 and is operative to detect the presence of a particular bit near the end of the code pattern at which time it enables a restart pulse to commence regeneration of the internal code pattern. The correlators 60, 62, and 64 provide bit streams from the incoming test pattern which are a measure of whether the pattern is early, normal, or late; that is, whether the pattern has slipped backward or forward by one bit position.

The correlators 60, 62, and 64 are each coupled to a bit slip detector 68 which controls operation of a pulse detector 70, also coupled to correlator 64, and a pulse detector 72, also coupled to correlator 60. The outputs of correlators 60, 62, and 64 are also applied to a restart pulse generator 74 which is operative to provide restart signals to commence a new cycle of operation when all of the correlators are receiving nonsynchronized information. Correlator 62 is also coupled to an out-of-sync indicator 75 which provides visual indication of a non-synchronized condition which occurs when the received code pattern is unrecognizable by the system. The pulse detectors 70 and 72, pulse generator 74 and correlator 62 are coupled to respective switch positions of a switching network 76, the output of which is applied to a counter 78. Counter 78 is governed by counter control logic 80 and counter selection 82 and is operative to drive a suitable display 84 which can be, for example, a numerical glow tube display.

The internally generated, error free code pattern provided by shift register 42 is compared in correlators 60, 62 and 64, with the related code pattern from the data link. Correlator 62 is operative to compare the normal code pattern for indication of errors between received data and the locally generated reference data. Correlator 60 provides a comparison between received data and a code pattern which is out of step therewith by one bit position backward, while correlator 64 provides a signal comparison for a code pattern which has slipped forward by one bit position. Thus correlators 60 and 64 provide information concerning the slippage, backward or forward respectively, of the code pattern.

Bit slip detector 68 is operative to determine that the code pattern has slipped forward or backward, and pulse detectors 70 and 72 are operative to store an indication of such bit slippage and to provide a signal to pulse generators 52 and 54, respectively, for purposes of resetting shift register 42 accordingly to force the register back into the generation of a proper time based pattern. If the code pattern has slipped backward by one bit, pulse generator 54 is operative during the frame sync time to cause repetition of a register word in order to correct the time displacement of the data being generated. If, on the other hand, the code pattern has slipped forward by 1 bit portion, pulse generator 52 is operative during the frame sync time to skip one register count to correct the timing error.

Switching network 76 is operative to provide different information to counter 78 for corresponding display. With switch 76 in position A, errors provided by correlator 62 between the locally generated code pattern and the received data are presented to counter 78 for accumulation and display. The time interval during which errors are counted is determined by the manual selector 82. With switch 76 in position B, counter 78 is able to accumulate a count of the number of restart signals which have occurred and which indicates the number of times that the system has attempted synchronization. The counter 78 is also operative to display the number of errors occurring in a slipped code word by utilizing positions C or D of switch 76.

The invention is not to be limited by what has been particularly shown and described except as indicated in the appended claims.

What is claimed is:

1. An error rate detection system comprising:

means for generating a pseudo-random coded message;

means for applying said message to an input terminal of a data network under test;

means coupled to an output terminal of said data network and operative to locally generate in response to said received message, a like pseudo-random coded message;

means for comparing said received message with said locally generated message to determine bit errors therebetween;

means for detecting a one bit slippage between said received message and the locally generated message apart from general synchronization loss; and means for counting said bit errors during a predetermined time interval.

2. An error rate detector system according to claim 1 wherein said means coupled to an output terminal of said data network includes means operative to synchronize said locally generated message with said received message.

3. An error rate detection system according to claim 1 including:

means responsive to detection of message slippage by one bit for adjusting the synchronization of said received message to thereby correct the timing of said received message by 1 bit.

4. An error rate detection system according to claim 1 wherein said means for generating a pseudo-random coded message includes:

a shift register having a serial data input terminal and a serial data output terminal;

an Exclusive OR circuit;

means coupling selected bit positions of said shift register to respective inputs of said Exclusive OR circuit;

means for alternatively coupling the output of said Exclusive OR circuit or the received message to the input of said shift register; and means for applying clock signals to said shift register;

the output of said shift register providing a repetitive pseudo-random code pattern.

5. An error rate detection system according to claim 4 further including:

blanking circuitry coupled to the output of said shift register and operative to blank selected bits of a generated code pattern;

means coupled to said shift register and operative to recognize a predetermined data word condition and to provide in response to such recognition an output pulse to said blanking circuit indicating frame synchronization.

6. An error rate detection system according to claim 4 including means coupled to said shift register and operative to recognize a predetermined data word condition and to provide in response to said recognition an output signal indicating frame synchronization.

7. An error rate detection system according to claim 4 including:

first means coupled to said shift register and operative to detect a first predetermined data word condition and to provide in response to said detection an output signal indicating frame synchronization; and second means coupled to said shift register and operative to detect an erroneous data word condition and to provide in response to said last named detection a signal to clear said shift register.

8. An error rate detection system according to claim 7 wherein said first means is operative to recognize an all zero data word condition and wherein said second means is operative to recognize an all ones data word condition.

9. An error rate detection system according to claim 4 including:

a code converter responsive to the output of said shift register;

a code selector coupled to said code converter;

said code converter being operative to provide in response to the setting of said code selector a selected signal format for said pseudo-random coded message.

10. An error rate detection system according to claim 1 wherein said comparing means and said slipped message detecting means include:

first, second and third correlators each operative to receive said received message and said locally generated message;

said first correlator providing a comparison between received data and a code pattern which is out of step therewith by one bit position backward;

said second correlator providing a comparison between received data and a code pattern which is out of step therewith by one bit position forward;

said third correlator providing a comparison between received data and a code pattern in synchronism therewith;

detector means coupled to said first, second and third correlators and operative to provide an indication of bit slippage; and means operative in response to said bit slippage indication to adjust the timing of said shift register thereby to correct the time reference of said locally generated coded message.

* * * * *